United States Patent [19]

Shibahara et al.

[11] 4,332,993

[45] Jun. 1, 1982

[54] BUILT-IN TYPE MICROWAVE OVEN

[75] Inventors: Jun Shibahara; Akira Matsumura, both of Fuji, Japan

[73] Assignee: Tokyo Shibaura Denki Kabushiki Kaisha, Kanagawa, Japan

[21] Appl. No.: 259,366

[22] Filed: Apr. 30, 1981

Related U.S. Application Data

[63] Continuation of Ser. No. 69,182, Aug. 24, 1979, abandoned.

[30] Foreign Application Priority Data

| | | | |
|---|---|---|---|
| Sep. 2, 1978 | [JP] | Japan | 53-121093 |
| Sep. 2, 1978 | [JP] | Japan | 53-121094 |
| Oct. 12, 1978 | [JP] | Japan | 53-139923 |
| Oct. 12, 1978 | [JP] | Japan | 53-139924 |

[51] Int. Cl.[3] .......................... H05B 6/80; A47J 36/38

[52] U.S. Cl. ........................ 219/10.55 R; 219/10.55 E; 219/400; 126/21 A; 126/299 R; 98/115 VM

[58] Field of Search ................. 219/10.55 R, 10.55 A, 219/10.55 M, 10.55 E, 400; 126/299 R, 299 C, 299 D, 299 E, 299 F, 273 A, 21 A, 21 R; 98/115 R, 115 VM, 115 LH, ; 312/236; 174/16 R

[56] References Cited

U.S. PATENT DOCUMENTS

| | | | |
|---|---|---|---|
| 2,889,442 | 6/1959 | Schultz | 312/236 |
| 3,859,901 | 1/1975 | White | 126/299 R |
| 3,954,427 | 5/1976 | Jenn | 126/299 D X |
| 4,096,370 | 6/1978 | Duncan | 219/10.55 B X |
| 4,120,290 | 10/1978 | Bowen, Jr. et al. | 126/299 D |

FOREIGN PATENT DOCUMENTS

| | | |
|---|---|---|
| 1032763 | 6/1966 | United Kingdom . |
| 2028491 | 3/1980 | United Kingdom . |

*Primary Examiner*—Roy N. Envall, Jr.
*Assistant Examiner*—Philip H. Leung
*Attorney, Agent, or Firm*—Stevens, Davis, Miller & Mosher

[57] ABSTRACT

A microwave oven of the type which is built in a recess formed in a wall of, for example, a home kitchen includes a box-like air guide member to be mounted on the microwave oven. The air guide member generally comprises side panels, front and rear panels, and top panel, and the front panel is provided with an opening for exhausting air used to cool the microwave oven to the atmosphere. An electric fan may be accommodated in the air guide member for enhancing the cooling effect.

2 Claims, 6 Drawing Figures

BUILT-IN TYPE MICROWAVE OVEN

This is a continuation of application Ser. No. 069,182 filed Aug. 24, 1979, now abandoned.

BACKGROUND OF THE INVENTION

This invention relates to a built-in type microwave oven which is used at a time when it is installed in a recess formed in the wall of, for example, a home kitchen and more particularly an air guide member to be mounted on the body of the microwave oven.

Recently, it has been desired to set a microwave oven in a recess formed in the wall of a home kitchen for the purpose of effectively utilizing the space of the home kitchen. The microwave oven of this type is called a built-in type microwave oven.

A built-in type microwave oven generally includes an air blower for cooling electrical elements arranged therein and is provided with air exhaust slits on the upper surface of the cabinet of the microwave oven. When the microwave oven of this type is installed in a recess formed in the wall of a home kitchen and having substantially the same dimensions as those of the cabinet of the oven, the air exhaust slits would be closed by the wall of the recess and the temperature of the interior of the microwave oven will rise extremely thereby shortening the expected life of the elements of the microwave oven.

In order to obviate this inconvenience, it would be necessary to form a recess in the wall of the home kitchen having dimensions larger than those of the oven cabinet to provide spaces between the walls of the recess and the oven cabinet. Elongated panels are disposed to close the spaces on both sides and upper and lower sides of the recess, and at least one of these panels, especially upper panel, is provided with exhaust slits for escaping air which has been used to cool the elements in the microwave oven and exhausted from the slits formed on the upper surface of the oven cabinet.

However, the built-in type microwave oven described above requires additional elements such as elongated panels and additional work for mounting these panels. Moreover, in order to improve the appearance of the oven it is necessary to constantly clean the spaces between the walls of the recess and the oven cabinet from the entrance of dust and dirt.

SUMMARY OF THE INVENTION

Accordingly, an object of this invention is to provide a built-in type microwave oven capable of being effectively installed in a recess formed in the wall and satisfactorily exhausting air used for cooling the interior of the microwave oven.

Another object of this invention is to provide an air guide member, preferably including an electric fan, to be mounted on the microwave oven for effectively exhausting the air used for cooling the interior of the microwave oven.

According to this invention, in one aspect there is provided a built-in type microwave oven including a cabinet covering the microwave oven, wherein the cabinet is provided with an opening on the upper surface thereof and an air guide member is mounted on the cabinet, the air guide member comprising side panels, front and rear panels, and a top panel, the front panel being provided with an opening communicating with the opening formed on the upper surface of the cabinet, and the air guide member has a longitudinal length substantially equal to that of the cabinet.

In another aspect according to this invention, the side panels of the air guide member cover both sides of the microwave oven and the cabinet of the microwave oven is eliminated.

DESCRIPTION OF THE PREFERRED EMBODIMENTS

Figure 1:
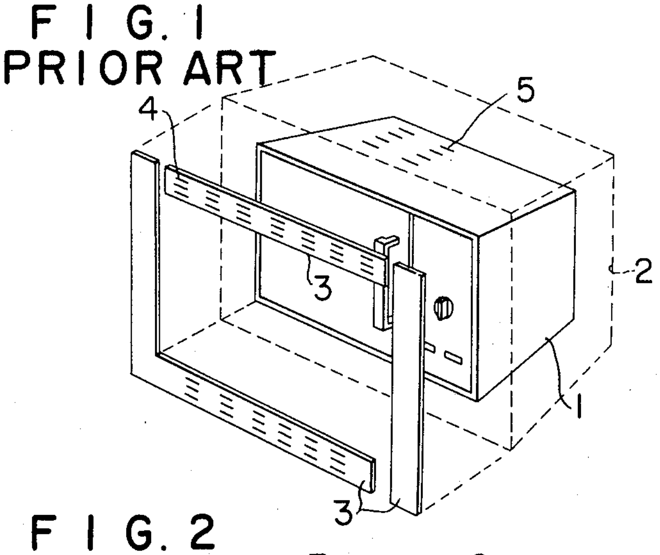
F I G. 1 PRIOR ART
FIG. 1 shows a perspective view of a built-in type microwave oven according to a prior art.

Before describing this invention a built-in type microwave oven of a prior art will firstly be described hereunder in conjunction with FIG. 1 for the sake of clear understanding of this invention.

Referring to FIG. 1, a microwave oven 1 is built in a rectangular recess 2 formed in the wall of a home kitchen. The recess 2 has internal dimensions larger than the outside dimensions of the cabinet of the microwave oven so that some spaces are left between the walls of the recess 2 and the oven cabinet to exhaust to the outside air used for cooling the interior of the microwave oven and exhausted from the slits 5 formed on the upper surface of the oven cabinet. Elongated panels are disposed on both sides and upper and lower sides of the recess 2 to close the spaces between the walls of the recess 2 and the oven cabinet. At least one of these panels, especially the upper one, is provided with slits for exhausting the air passing through the slits 5.

However, regarding the built-in type microwave oven shown in FIG. 1, it is necessary to form a recess in the wall having dimensions larger than the outside dimensions of the oven cabinet 1. As above described additional elements such as elongated panels 3 and additional work for mounting them are required. In addition, in order to improve appearance, it is necessary to keep clean the spaces between the walls of the recess 2 and the oven cabinet 1 by preventing dust and dirt from entering the spaces.

Figure 2:
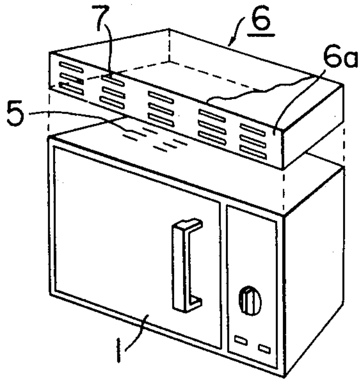
FIG. 2 shows a perspective view of one embodiment of a built-in type microwave oven according to this invention.

FIG. 2 shows an embodiment of a rectangular air guide member to be attached to a built-in type microwave oven according to this invention for the purpose of obviating the defects described above.

The air guide member 6 is mounted on and attached to the upper surface of the cabinet of the microwave oven 1 by using suitable attaching members, not shown. The air guide member 6 generally comprises a box, rectangular in cross section, having side panels, front and rear panels and a top panel. The longitudinal and traverse lengths of the air guide member 6 are designed to be substantially equal to those of the oven cabinet 1. The front panel **6*a* of the air guide member 6 is provided with a plurality of slits 7 through which the air exhausted from the microwave oven into the air guide member 6 is exhausted outwardly. The microwave oven 1 is built in the recess 2 formed in the wall of a kitchen and thereafter the air guide member is inserted into the recess and then mounted on the microwave oven. It is of course possible to preliminarily mount the air guide member on the oven and thereafter insert them into the recess 2. The dimensions of the recess 2 is determined to be substantially equal to the outer diameters of the microwave oven and the guide member. Although the air guide member 6 shown in FIG. 2 is not provided with a bottom panel, it is possible to form the bottom wall, but in this case it is necessary to form an opening thereon through which the air exhausted from the interior of the oven 1 through the slits 5** can enter into the air guide member.

Figure 3:
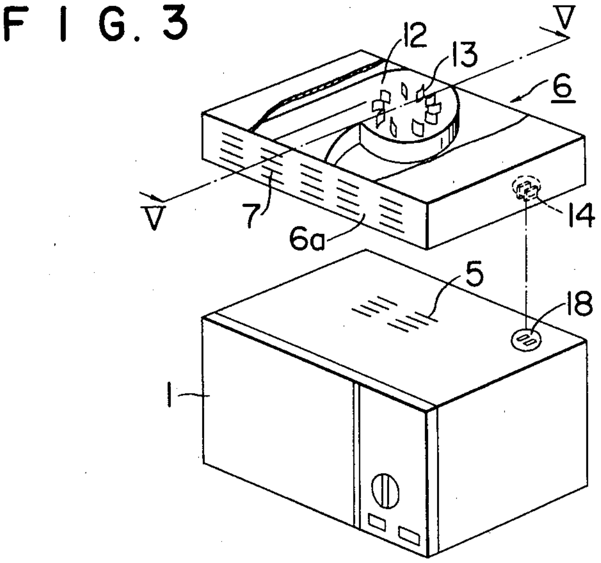
FIG. 3 shows another embodiment of the built-in type microwave oven according to this invention.

FIG. 3 shows another embodiment of the air guide member according to this invention which includes an electric fan 13 so as to exhaust the air exhausted from the interior of the microwave oven through the slits 5 outwardly through a passage 12 and slits 7 formed on the front panel **6*a* of the air guide member 6. The fan 13 is located above the slits 5 and the outlet end of the air passage 12 is communicated with the slits 7 provided for the front panel 6*a* of the air guide member 6. A connecting plug 14 is attached to the lower surface of the air guide member 6 to be received by a socket 18 mounted on the upper surface of the oven cabinet to drive a fan driving motor, not shown in FIG. 3**.

Figure 4:
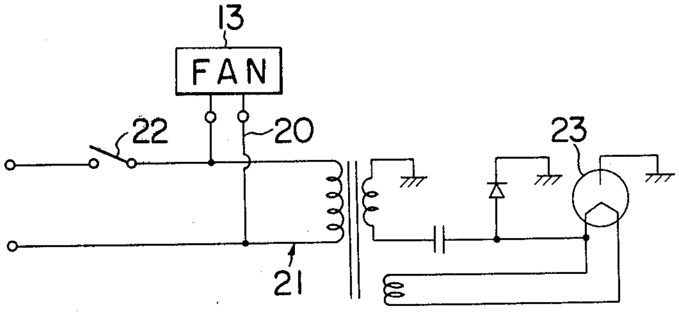
FIG. 4 shows a circuit diagram of the built-in type microwave oven of this invention.

An electric circuit 20 for operating the fan 13 is shown in FIG. 4 and when the circuit 20 is connected to a magnetron circuit 21 of the microwave oven 1 and a switch is closed by connecting the plug 14 to the socket 18, the fan 13 and the magnetron 23 are both energized. It will clear that connection of the fan 13 to the magnetron circuit 21 may be made by any other means than those shown in FIG. 3, for example, by a plug and socket provided on the back of the cabinet.

Figure 5:
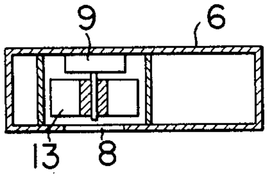
FIG. 5 is a cross sectional view taken along the line V—V shown in FIG. 3.

In these examples, it is necessary to form an opening 8 through the bottom panel of the air guide member 6 through which the air exhausted from the interior of the microwave oven is sucked by the fan 13. The cross sectional view of this arrangement is shown in FIG. 5, in which reference numeral 9 designates an electric motor to drive the fan 13.

Figure 6:
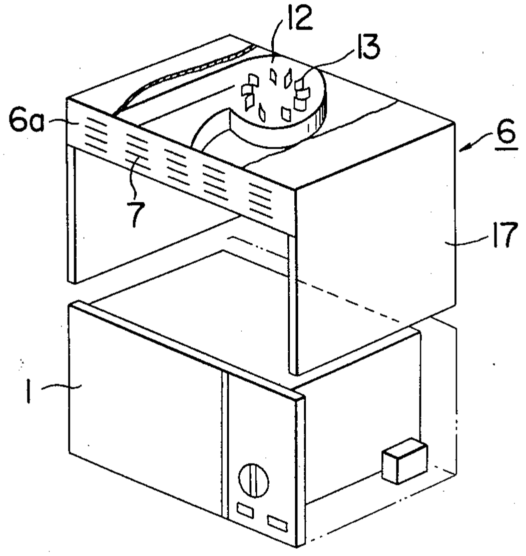
FIG. 6 shows another embodiment of the built-in type microwave oven according to this invention.

FIG. 6 shows yet another embodiment of this invention, in which both side panels 17 of the air guide member 6 are extended downwardly to cover both sides of the body of the microwave oven. In this embodiment, the cabinet of the microwave oven 1 can be eliminated and heated air existing between the extended side panels 17 and the body of the microwave oven is exhausted outwardly by the fan 13 incorporated in the air guide member 6 through the slits formed on the front panel **6*a* thereof. The fan 13** cooperates with the magnetron in the manner described hereinbefore.

According to the air guide member of the microwave oven of this invention, the installation thereof can easily be performed by inserting it independently or after assembling it into the recess formed in the wall. Close fitting of the microwave oven into the recess improves the appearance of the wall of the kitchen because the oven and the air guide member are flush with the wall surface. Air which has been used to cool the interior of the microwave oven is exhausted in the air guide member and then exhausted outwardly through the slits formed on the front panel of the air guide member thereby preventing elements of the microwave oven from being overheated. This cooling effect is extremely enhanced by arranging an electric fan within the air guide member. Moreover, since the fan is electrically connected to the magnetron of the microwave oven, the microwave oven is not operated unless the fan is driven, thus preventing the overheating of the interior of the microwave oven.

It is understood by those skilled in the art that some preferred embodiments of this invention have been described hereinabove, but various changes and modifications will be made without departing from the spirit and scope of this invention.

We claim:

1. A built-in type microwave oven comprising:

a cabinet covering the microwave oven and provided with an opening on the upper surface of said cabinet communicating with said oven, said oven including a magnetron energizing circuit and said cabinet including an electrical socket mounted in said upper surface and connected to said magnetron energizing circuit to receive electrical power therefrom, an air guide member detachably mounted on said cabinet, said air guide member comprising side panels, front and rear panels, a bottom panel having a lower surface and a top panel and enclosing said opening in the upper surface of said cabinet, said front panel being provided with an outlet opening communicating with atmosphere and with said opening formed on the upper surface of said cabinet, said air guide member conducting oven cooling air heated in said oven to atmosphere and having a longitudinal length substantially equal to that of said cabinet, said air guide member further comprising an electric fan contained therein and positioned above said opening formed through said cabinet, an air passage for guiding air from said fan to said outlet opening of said front panel, and a connecting electrical plug attached to said lower surface of said bottom panel and electrically connected to a driving motor of said fan, said plug being received by said socket mounted on the upper surface of said cabinet to supply electrical power from said socket to said fan driving motor, said fan being electrically connected to said magnetron energizing circuit in the microwave oven through said plug and socket.

2. The built-in type microwave oven according to claim 1 wherein said bottom panel is provided with an opening communicating with said opening formed on the upper surface of said cabinet.

* * * * *